STANLEY BERNARD NEWPORT
TERENCE LONG — Inventors
Hall, Pollock & Vande Sande — Attorneys

United States Patent Office 3,400,583
Patented Sept. 10, 1968

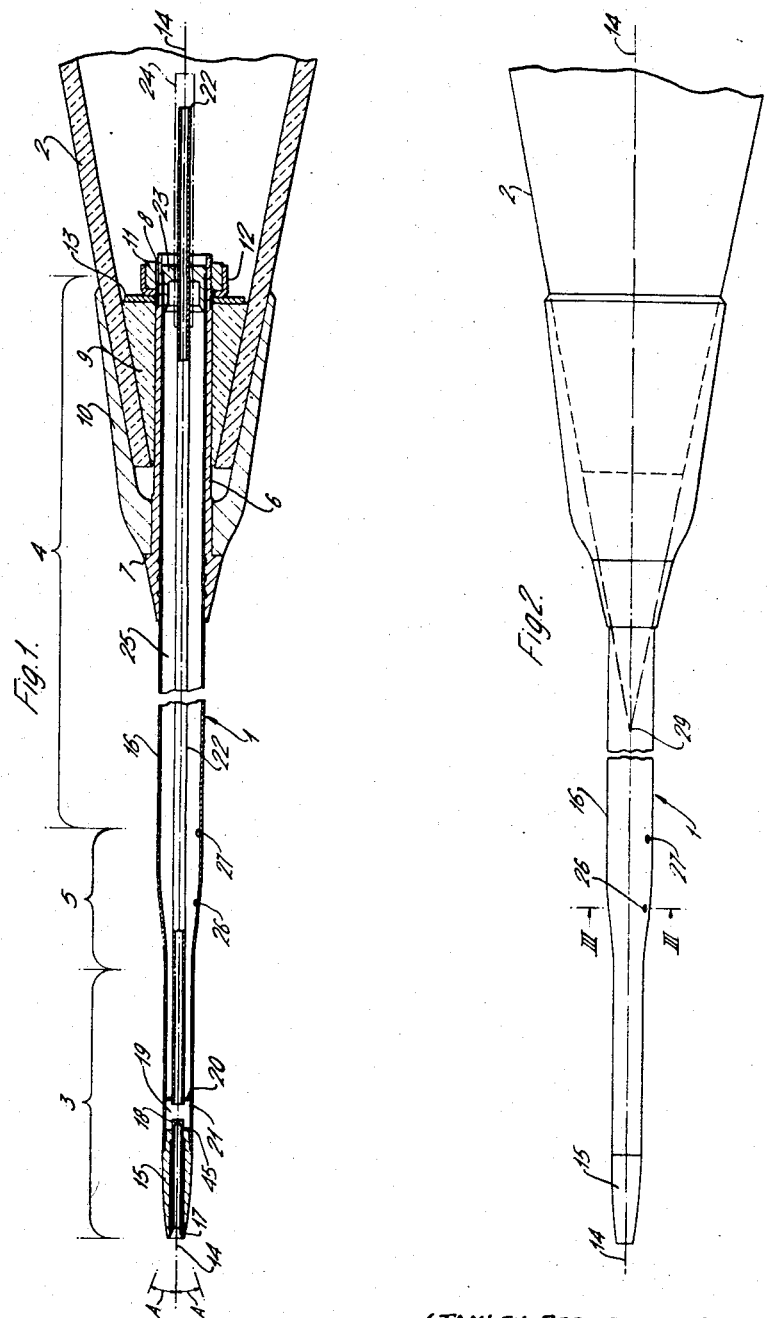

3,400,583
PITOT-STATIC PROBES
Stanley Bernard Newport, Charlton Kings, Cheltenham, and Terence Long, Gotherington, Cheltenham, England, assignors to Smiths Industries Limited, London, England, a British company
Filed Mar. 16, 1966, Ser. No. 534,827
Claims priority, application Great Britain, Mar. 17, 1965, 11,399/65
10 Claims. (Cl. 73—182)

ABSTRACT OF THE DISCLOSURE

An electrically-heated pitot-static probe, self-compensating for static-pressure error, has two spaced sets of static-sensing ports located in a portion of the probe that is of increasing cross-section aftwards along the probe from a cylindrical forward portion to a cylindrical main-body portion of larger diameter. The forward portion has an ogival nose provided with a pitot-sensing port, and the aft-end of the main-body portion is clamped to an aircraft-nose by internally- and externally-fitting conical shells.

---

The invention is concerned, though not exclusively so, with pitot-static probes for use on aircraft that are capable of airspeeds varying from subsonic to supersonic.

According to the present invention, a pitot-static probe of elongated, slender form comprises a forward portion having a forward-facing port for sensing pitot pressure, a main-body portion axially aligned with, and aft of, the forward portion, and an intermediae portion which interconnects the forward and main-body portions and which is of increasing section in the aft direction to provide transition from the forward portion to the main-body portion, one or more ports for sensing static pressure being located on the probe to lie within a region extending from the forward end of the intermediate portion to just beyond the aft end of the intermediate portion.

The probe, when in use on an aircraft, is preferably mounted to project forward from the nose of the aircraft, the intermediate portion of the probe in these circumstances acting at subsonic airspeeds to induce at the one or more static-pressure ports air-pressure conditions tending to compensate for the conditions that are induced there due to the aircraft. This compensation ensures that the pressure sensed by the one or more static-pressure ports is substantially the appropriate free-stream static pressure, and allows the use of a shorter probe than would otherwise be possible to sense the free-stream static pressure. At supersonic airspeeds that are sufficiently above the speed of sound for the shock wave at the bow of the aircraft to have passed to the rear of the one or more static-pressure ports, the air-pressure conditions at the one or more ports are independent of the presence of the aircraft. Thus, where the probe is also to sense the free-stream static pressure at such supersonic airspeeds, the intermediate portion of the probe is arranged (by suitable choice of its profile) to induce appropriate air-pressure conditions for this at the one or more ports. According to well-established theory of supersonic air-flow, there is generally a wide choice of suitable profiles available in this respect, and the matter resolves itself into one of selecting from the profiles suitable at supersonic airspeeds, a profile that will give the appropriate compensation at the one or more ports through the subsonic range.

A plurality of static-pressure ports may be provided, these being spaced from one another longitudinally of the probe within said region. Alternatively, or in addition, a plurality of static-pressure ports may be located within said region at any one position longitudinally of the probe. In particular, a pair of static-pressure ports may be provided at the same position longitudinally of the probe, the two ports of the pair being spaced from one another around the outer surface of the probe at that position. Two pairs of ports may be provided in said region in this manner, the two pairs of ports being spaced from one another longitudinally of the probe.

According to a feature of the present invention, a pitot-static probe of elongated, slender form and circular cross-section, comprises an elongated forward portion which has a forward end of increasing cross-section in the aft direction and which from its forward end to its aft end is of cylindrical form, a cylindrical main-body portion which is of larger cross-section than said forward portion and which from its forward end extends to the aft end of the probe in axial alignment with said forward portion, and an intermediate portion which interconnects the aft end of said forward portion to the forward end of the main-body portion and which is of increasing cross-section in the aft direction to provide transition from the forward portion to the main-body portion, the forward portion having in its forward extremity a forward-facing port for sensing pitot pressure, and the intermediate portion having a plurality of laterally-facing ports for sensing static pressure that are each spaced in the aft direction from said forward portion.

A pitot-static probe in accordance with the present invention will now be described, by way of example, with reference to the accompanying drawings, in which:

FIGURES 1 and 2 are respectively a sectional side elevation, and a side elevation, of the pitot-static probe as mounted on the nose of an aircraft;

Figure 3:
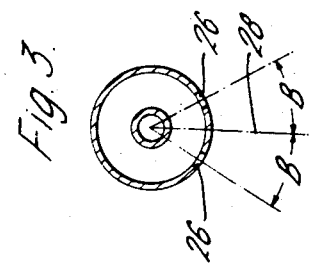
FIGURE 3 is a section taken on the line III—III of FIGURE 2.

Referring to FIGURES 1 to 3, the pitot-static probe 1, which is clamped to the conical nose 2 of the aircraft, is of elongated, slender profile and has a forward portion 3 that is connected at its aft end to a main-body portion 4 of the probe 1 through an intermediate portion 5. The main-body portion 4, at its aft end, passes into the nose 2 and through the nose 2 carries an externally-fitting sleeve 6. The sleeve 6, which is brazed to the portion 4, has an externally-projecting shoulder 7 at its forward end in front of the nose 2, and is provided with an external screw thread 8 at its aft end within the nose 2. The probe 1 is clamped to the nose 2 using internal and external conical shells 9 and 10 respectively, together with a nut 11 screwed on the thread 8 and locked in position by means of a locking member 12. The nut 11 acts via a plain washer 13 to urge the internal shell 9 into the nose 2, and at the same time, by reaction via the shoulder 7, urges the external shell 10 onto the nose 2, so that the probe 1 is thereby held projecting ahead of the aircraft with its longitudinal axis 14 along, or slightly inclined upwards from, the line of flight.

The probe 1 is of circular cross-section throughout, the forward portion 3, apart from its nose 15, and the main body portion 4 both being of cylindrical form. Apart from the substantially-solid nose 15, the probe 1 is of a generally-hollow tubular construction having an outer wall 16 suitably profiled along the length of the intermediate portion 5 to provide transition between the portions 3 and 4 of differing diameter. Although this is not essentially so, the portion 5 in the present case is shaped to provide a smooth transition, without any abrupt change in profile, between the portions 3 and 4. The nose 15 of the portion 3 is of ogival profile having a forward-facing port 17 for sensing the combined dynamic and static air-pressure, that is to say the pitot air-pressure. The port 17 occupies substantially the whole cross-sectional area at the forward extremity of the nose 15 and converges symmetrically in the aft direction at an angle A to the axis 14. A pipe 18 carried by the nose 15 connects the port 17 to a chamber 19 that is formed within the forward portion 3 between the nose 15 and an air-tight bulkhead 20 that is sealed to the tubular wall 16. The chamber 19 serves as a trap for any water entering the probe 1 through the port 17, and is drained by means of a vent 21 in the lower part of the wall 16. A pipe 22, which projects through the bulkhead 20 to open into the chamber 19 and which from the chamber 19 extends the length of the probe 1, serves to communicate the pitot-pressure within the chamber 19 to the aft end of the probe 1. The pipe 22 projects from the aft end of the probe 1 through an air-tight plug 23 sealed to the wall 16 and the surrounding sleeve 6, thereby to provide the pitot-outlet of the probe 1.

A further pipe 24 that projects through the plug 23 from the aft end of the probe 1 provides the static-outlet, this pipe 24 opening into the chamber 25 formed within the tubular wall 16 between the bulkhead 20 and the plug 23. Two pairs of laterally-facing ports 26 and 27 for sensing static air-pressure, extend through the wall 16 into the chamber 25, the two ports of each pair being positioned on opposite sides from one another of the downward vertical 28 (see FIGURE 3) through the axis 14 and being angularly spaced from it about the axis 14 by an angle B. The ports 26 are located mid-way along the length of the intermediate portion 5, whereas the ports 27 are located at the junction of the portion 5 with the main-body portion 4.

The location of the ports 26 and 27 within the region of the probe 1 defined approximately by the intermediate portion 5, ensures that the pressure-value sensed by these ports (and communicated via the chamber 25 to the static-outlet pipe 24) is sensibly representative of the free-stream static pressure. The intermediate portion 5 provides compensation for the fact that the distance along the axis 14 of each port 26 and 27 from the virtual apex 29 (see FIGURE 2) of the conical nose 2, is substantially less than that otherwise required ahead of the aircraft, to ensure the presence of free-stream conditions to the same degree of sensibility. The compensation achieved in this respect applies throughout the subsonic range of airspeeds, through the transonic range and into the supersonic range. A criterion for assessing the compensation achieved, is the coefficient of static-pressure error, this coefficient being expressed as:

$$(P_x - P_f)/Q_c$$

where $P_x$ is the local static pressure at distance $x$ ahead of the aircraft, $P_f$ is the free-stream static pressure, and $Q_c$ is the impact pressure, that is to say, the difference between the free-stream total pressure and the free-stream static pressure.

Figure 4:
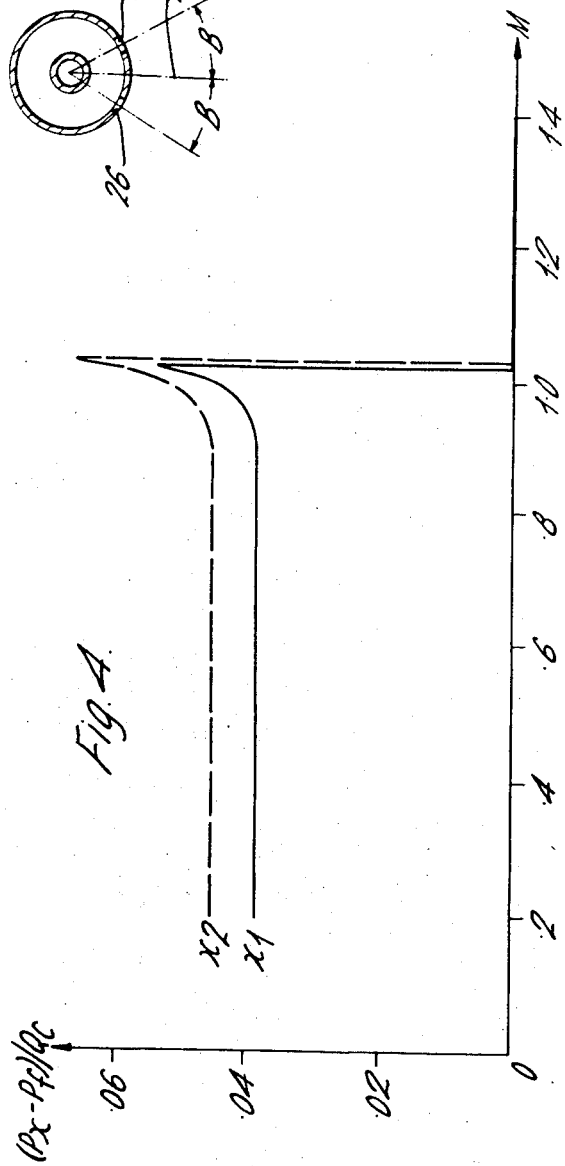
FIGURE 4 illustrates the variation of the coefficient of static-pressure error with airspeed, at different distances ahead of the aircraft.

FIGURE 4 shows the variation of the coefficient of static-pressure error with airspeed for each of two positions ahead of the aircraft in the absence of the probe 1. The airspeed is expressed in terms of free-stream Mach number M and the characteristics in full and broken lines illustrate respectively the conditions at distances $x_1$ and $x_2$ ahead of the virtual apex 29 of the nose 2 in the absence of the probe 1. The distances $x_1$ and $x_2$ are equal respectively to the longitudinal spacings of the ports 26 and 27 from the apex 29 when the probe 1 is installed on the nose 2 as shown in FIGURES 1 and 2. (The spacing between the characteristics of FIGURE 4 is exaggerated in the interests of clarity.)

Referring to FIGURE 4, the value of the coefficient of static-pressure error is substantially independent of Mach number through the subsonic range up to the critical Mach number $M_c$ for the aircraft, that is to say, up to the free-stream Mach number at which sonic speed is approached at some point on the aircraft-body. At the critical Mach number $M_c$, the coefficient of static-pressure error begins to increase. This increase continues with the development of a supersonic region on the aircraft-body as the Mach number increases through the transonic range above the critical Mach number $M_c$. As the free-stream Mach number M increases through unity a shock wave forms ahead of the aircraft. Air flow behind the shock wave is subsonic so the aircraft continues to influence the pressure $P_x$ until with increasing Mach number M, the distance from the aircraft to the shock wave is reduced through $x$, whereupon there is a sharp decrease in the pressure $P_x$. This decrease corresponds in substance to the difference between the pressures in front of, and immediately behind, the shock wave. The smaller the value of distance $x$, the higher the value of Mach number M at which the decrease takes place, and the larger the decrease. After the shock wave has passed, and into the supersonic range of the aircraft, the coefficient of static-pressure error is zero, the value of pressure $P_x$ being the free-stream static-pressure value, $P_f$.

FIGURE 4 represents the conditions that apply in the absence of the probe 1 projecting from the nose 2. The probe 1, and in particular the profiled intermediate portion 5, positioned in the airstream ahead of the aircraft, modifies the conditions represented in FIGURE 4 in such a way that the value of the coefficient of static-pressure error in the chamber 25 vented to the surface of the probe 1 at the distances $x_1$ and $x_2$, that is to say at the ports 26 and 27, is substantially zero throughout the subsonic and transonic ranges as well as the supersonic. For subsonic air-flow, the portion 5 of increasing cross-sectional area in the downstream direction, tends to induce on the surface of the probe 1 negative values of pressure so that the local static-pressure $P_x$ is then less than the free-stream value $P_f$. This applies throughout a region beginning aft of the junction between the portions 3 and 5 and extending just into the main-body portion 4. Aft from the junction between the portions 3 and 5, the induced pressure decreases smoothly from positive to negative, passing through zero at a point approximately one-third of the length of the portion 5 downstream. The induced pressure is negative at least for the region extending along the remaining two-thirds of the portion 5, and into the main-body portion 4 downstream from the junction with the portion 5, by a distance equal approxamtely to the diameter of the main-body portion 4. In the absence of the aircraft behind the probe 1, the coefficient of static-pressure error at any position on the probe 1 within this region, is negative throughout the subsonic and transonic ranges. The coefficient is substantially independent of Mach number M through the subsonic range, and, more specifically, through this range has values at the distances $x_1$ and $x_2$ that are approximately of the same magnitude as the values (indicated in FIGURE 4) applicable to the aircraft alone. Thus, at each port 26 and 27 through the subsonic range, the coefficient of static-pressure error due to the aircraft tends to be cancelled out by that due to the probe 1 itself. Although complete cancellation may not be achieved at each port 26 and 27, the mean error as effective in the common chamber 25 is substantially zero. The resultant coefficient for the combination of aircraft and probe 1 is therefore substantially zero throughout the subsonic range, and, accordingly, the value of pressure $P_x$ sensed is substantially the free-stream value $P_f$.

Through the transonic range with the probe 1 in combination with the aircraft, the air-flow over the probe 1 is retarded by the presence of the aircraft. In general, the flow over the probe 1 is not supersonic until the free-stream airspeed is also supersonic, and the resultant value of the pressure $P_x$ sensed in the chamber 25 is substantially the same as that of the free-stream value $P_f$. Under supersonic conditions the induced pressures at the ports 26 and 27 tend to be positive and negative respectively, the resultant pressure in the chamber 25 being substantially equal to the free-stream value $P_f$.

It will be appreciated that the characteristics shown in FIGURE 4, are representative only in general form, the particular form in any one case, and hence the compensation required, being dependent upon the profile of the aircraft involved. Similarly, the characteristics of the probe itself, together with the compensation provided, depends upon the form of the various portions of the probe 1, in particular, the length and diameter of the forward portion 3, the length and profile of the intermediate portion 5, and the length and diameter of the main-body portion 4.

In general, the length of the forward portions 3 from the aft end of the nose 15 to the beginning of the intermediate portion 5, is required to be at least six times the main diameter of the portion 3, in order to minimise the effect on the sensed static-pressure of the portion 3 containing the pitot port 17. Where supersonic airspeeds are involved, the profile of the intermediate portion 5 requires to be chosen to ensure that the resultant static-pressure error in the chamber 25 is zero, or substantially so, throughout the relevant supersonic range. Where only subsonic airspeeds are involved, however, the profile of the intermediate portion 5 may be, for example, of a form generated by revolution about the axis 14 of part of an ellipse, such ellipse having its major axis collinear with the axis 14 and its minor axis at the junction of the portion 5 with the main-body portion 4. Alternatively, the portion 5 may have a profile of a form provided by rotation about the axis 14 of an arc of a circle having its centre spaced some distance from the axis 14, or may simply be frusto-conical. In each case, the surface of the intermediate portion 5 may be curved slightly at the junctions with the portions 3 and 4 to provide smooth change from the forward portion 3, and to the main-body portion 4.

To a large extent, the details of dimensions and profile appropriate to any particular application of the probe 1, can only be determined from experimental observations during wind-tunnel tests. The ports 26 and 27 are located along the length of the probe on or near the portion 5, such as to ensure that the static pressure sensed in the chamber 25 during supersonic flight is truly the free-stream value. When the ports 26 and 27 are so located, the coefficient of static-pressure error due to the probe 1 alone is to be negative during subsonic flight, the particular value of the coefficient being dependent upon the factors of dimension and profile referred to above. However, factors other than those referred to above have to be taken into consideration. For example, it is necessary to take into account the range of possible angle of incidence and the range of possible angle of yaw relative to the airflow, because these affect the pressure distribution over the surface of the probe. The resultant variation in the compensation provided by the probe depends on the distribution of the static ports 26 and 27, and also to some extent on the variation in probe diameter along its length in the vicinity of the ports. In the present instance the angle B is 37.5 degrees, but other angular distributions of the ports 26 and 27 around the wall 16 may be used. Ports additional to the two pairs of ports 26 and 27, may also be provided.

As regards the sensing of pitot pressure, the errors affecting this are mainly those resulting from pitch and yaw and also Reynolds-number effects. The configuration of the pitot port 17 and the profile of the nose 15 is chosen to provide the best compromise in this respect. In the present instance the angle A is preferably fifteen degrees.

The probe 1, which in this example has an overall length of between some three and six feet, is of rigid construction and includes within its nose 15 and wall 16, heating elements not shown in FIGURES 1 to 3. The heating element within the wall 16 is a major structural part of the wall 16 and contributes significantly to the rigidity of the probe as a whole. The detailed construction of the wall 16 and nose 15 will now be described with reference to FIGURE 5.

Figure 5:
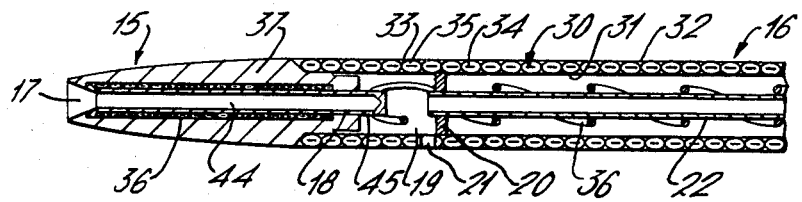
FIGURE 5 is a sectional side elevation of part of the probe, showing features of construction omitted from FIGURES 1 to 3.

Referring to FIGURE 5, the wall 16 throughout its length is formed by a heating conductor 30 which is closely wound on a stainless-steel cylindrical shell 31 within a closely-fitting stainless-steel cylindrical shell 32. The conductor 30, which is of a flattened, strip form, is of the kind having a metal sheath 33 enclosing a central wire or strip element 34 that is insulated electrically from the sheath 33 by a body 35 of metallic oxide compacted into the sheath 33. The element 34, which is preferably of nickel, has a high positive temperature coefficient of electrical resistance (that is to say, has a high rate of increase of electrical resistance with increase in temperature). The compacted body 35, which is preferably of magnesium oxide, has a high thermal conductivity.

The conductor 30 is brazed to the two shells 31 and 32, and is wound on the shell 31 as a parallel-sided loop so that the two ends of the conductor 30 both emerge from the aft end of the probe 1 and are thereby readily available for connection within the aircraft to a source of electric current. The adjacent turns of the conductor 30 are closely wound to abut one another and thereby provide with the thin shells 31 and 32 a sandwich structure of high rigidity without undue weight.

The manufacture of the wall 16 involves firstly the winding of the conductor 30 on a stainless-steel tube having in this example a wall-thickness of 0.01 inch. The tube carrying the conductor 30 is then inserted as a close fit within a second stainless-steel tube of the same wall-thickness. The two tubes and the conductor 30 within them, are then brazed together and the whole swaged to produce the required profile of the wall 16 with the inner tube providing the shell 31. The outer surface of the resulting structure is then skimmed down to remove all surface imperfections and provide the smooth, outer shell 32.

The nose 15, which is brazed to the tubular wall 16, includes a separate heating conductor 36 that is wound and compressed on to the pipe 18 within a solid stainless-steel outer nose-shell 37. The conductor 36 is of the same basic constructional form as the conductor 30 and is wound on the pipe 18 as a parallel-sided loop. The two ends of the conductor 36 emerge from the aft end of the probe 1 so as to be readily available, together with the two ends of the conductor 30, for connection to the source of current-supply within the aircraft. The conductor 36 is loosely wound on the pipe 22 along the length of the probe 1 from the nose 15, so that formation of ice within the pipe 22 is inhibited.

Figure 6:
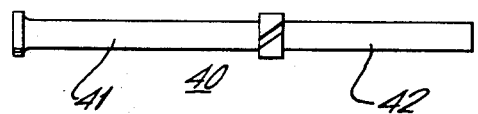
FIGURES 6 to 8 illustrate various stages in the manufacture of a part of the probe.
Figure 7:
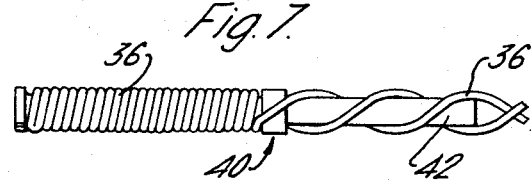
Figure 8:
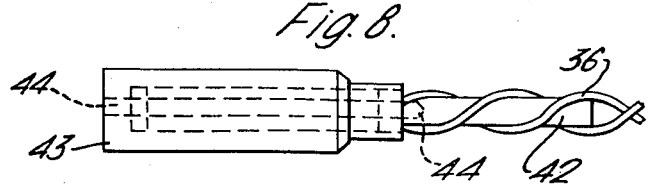

The manufacture of the nose 15 involves firstly the provision of a mandrel 40, as shown in FIGURE 6, having a portion 41 of reduced diameter, and a shank 42. The conductor 36 is wound as a parallel-sided loop on the portion 41 and then swaged flat as shown in FIGURE 7. As shown in FIGURE 8, a block 43, for providing the nose-shell 37 (see FIGURE 5), is then shrunk on to the mandrel 40 and brazed to it with the conductor 36 throughout the portion 41 situated within the block 43. The mandrel 40 is then drilled from its forward end to provide a blind bore 44 (of the pipe 18) extending partially into the shank 42. The block 43 is then machined to the required ogival profile, the pitot port 17 machined out from the forward end of the bore 44, and the shank 42 cut to appropriate length. A radial hole 45 (see FIGURE 5) is drilled into the shank 42 to communicate with the bore 44 and complete the pipe 18.

The construction of probe 1 with the heating conductors 30 and 36 incorporated therein as an intimate part of the structure, as shown in FIGURE 5, has the advantage of providing good thermal efficiency for de-icing, without overheating.

The fact that each conductor 30 and 36 is continuous and does not require jointing within the probe itself is an added advantage.

We claim:

1. A pitot-static probe of elongated, slender form for sensing pitot and static air-pressures through a range of airspeeds extending from subsonic into supersonic, comprising an elongated forward portion having a forward-facing port for sensing pitot pressure, said forward portion being cylindrical throughout a substantial part of its length, an elongated main-body portion axially aligned with, and aft of, said forward portion, said main-body portion at least at its forward end being of larger cross-section than said forward portion, and an intermediate portion interconnecting said forward and main-body portions, said intermediate portion being of increasing section in the aft direction from said forward portion to the main-body portion, and ports for sensing static pressure throughout said range, the static-sensing ports of the probe being located exclusively within a region extending lengthwise of the probe from the forward end of said intermediate portion to just aft of the aft end of said intermediate portion.

2. A pitot-static probe according to claim 1, wherein two pairs of intercoupled ports for sensing static pressure are located within said region, the two pairs of ports being spaced from one another longitudinally of the probe, and the two ports of each pair being spaced from one another around the outer surface of the probe.

3. A pitot-static probe according to claim 1, wherein the probe is of circular cross-section throughout its length.

4. A pitot-static probe according to claim 3, wherein said main-body portion is cylindrical throughout its length.

5. A pitot-static probe according to claim 1, wherein a pair of ports for sensing static pressure is located midway along said intermediate portion.

6. A pitot-static probe according to claim 5 wherein a further pair of ports for sensing static pressure is located at the junction between the intermediate and main-body portions.

7. A pitot-static probe according to claim 1, wherein said forward portion is of a length at least six times its diameter.

8. A pitot-static probe according to claim 1, wherein said ports for sensing static pressure are located within a region extending from a point that is aft of the junction between the forward and intermediate portions by a distance equal approximately to one-third of the length of the intermediate portion, to a point that is aft of the junction between the intermediate and main-body portions by a distance equal approximately to a diameter of the main-body portion.

9. In combination with an aircraft, a pitot-static probe of elongated slender form and circular cross-section mounted to project forward from the aircraft-nose, the probe comprising: an elongated forward portion which has a forward end of increasing cross-section in the aft direction and which from its forward end to its aft end is of cylindrical form, said forward portion having in its forward extremity a forward-facing port for sensing pitot pressure; a cylindrical main-body portion which is of larger cross-section than said forward portion and which from its forward end extends to the aft end of the probe in axial alignment with said forward portion; an intermediate portion interconnecting the aft end of said forward portion and the forward end of the main-body portion, the said intermediate portion having laterally-facing ports for sensing static pressure and being of increasing section in the aft direction to induce air-pressure conditions at said ports compensating at least partially for conditions induced there by the aircraft at subsonic airspeeds; and means clamping the probe to said aircraft-nose, the said clamping means including first and second conical shells fitting respectively internally and externally of said aircraft-nose, means urging the said first shell into said aircraft-nose from within, and means urging the said second shell onto said aircraft-nose.

10. A pitot-static probe of elongated, slender form for extending forwardly from the nose of an aircraft, comprising a forward portion having a forward-facing port for sensing pitot pressure, a main-body portion axially aligned with, and aft of, said forward portion, an intermediate portion interconnecting said forward and main-body portions, said intermediate portion being of increasing section in the aft direction from said forward portion to said main-body portion, and means for clamping the probe to said aircraft-nose, said clamping means comprising a first conical shell for fitting on said aircraft-nose externally, a second conical shell for fitting internally of said aircraft-nose, and means carried by said main-body portion for urging said first and second shells toward one another respectively onto and into said aircraft-nose, said probe having at least one port for sensing static pressure located within a region extending lengthwise of the probe from the forward end of said intermediate portion to just beyond the aft end of said intermediate portion.

References Cited

UNITED STATES PATENTS

| 2,662,402 | 12/1953 | Ince, et al. | 73—212 |
| 2,984,107 | 4/1961 | Strieby et al. | 73—212 |
| 3,097,528 | 7/1963 | Mohring | 73—212 |
| 3,120,123 | 2/1964 | Werner et al. | 73—212 |

OTHER REFERENCES

V. Ritchie, "Several Methods for Aerodynamic Reduction of Static Pressure Sensing Errors for Aircraft at Subsonic, Near-Sonic, and Low Supersonic Speeds," NASA TR-R-18 (1959) p. 10.

DAVID SCHONBERG, *Primary Examiner.*

NEIL B. SIEGEL, *Assistant Examiner.*